United States Patent
Acer et al.

(10) Patent No.: US 10,216,283 B2
(45) Date of Patent: Feb. 26, 2019

(54) USER-WEARABLE DEVICE FOR PERSONAL COMPUTING SYSTEM, PROCESSING UNIT FOR PERSONAL COMPUTING SYSTEM, AND METHOD ASSOCIATED THEREWITH

(71) Applicant: Alcatel Lucent, Boulogne Billancourt (FR)

(72) Inventors: Utku Gunay Acer, Antwerp (BE); Afra Mashhadi, Blanchardstown (IE); Marc Van Den Broeck, Antwerp (BE); Fahim Kawsar, Antwerp (BE)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 15/319,522

(22) PCT Filed: Jun. 12, 2015

(86) PCT No.: PCT/EP2015/063113
§ 371 (c)(1),
(2) Date: Dec. 16, 2016

(87) PCT Pub. No.: WO2015/193177
PCT Pub. Date: Dec. 23, 2015

(65) Prior Publication Data
US 2017/0235369 A1    Aug. 17, 2017

(30) Foreign Application Priority Data

Jun. 18, 2014  (EP) .................................... 14305932

(51) Int. Cl.
*G06F 3/01*    (2006.01)
*G06F 1/16*    (2006.01)
(Continued)

(52) U.S. Cl.
CPC .............. *G06F 3/017* (2013.01); *G06F 1/163* (2013.01); *G06F 1/165* (2013.01); *G06F 1/1649* (2013.01);
(Continued)

(58) Field of Classification Search
CPC ........ G06F 3/017; G06F 3/016; G06F 3/0346; G06F 3/04883; G06F 3/167; G06F 1/163; G06F 1/165
See application file for complete search history.

(56) References Cited

U.S. PATENT DOCUMENTS

2002/0159023 A1   10/2002  Swab
2008/0136775 A1*   6/2008  Conant ................... G06F 3/014
                                                 345/156
(Continued)

FOREIGN PATENT DOCUMENTS

| CN | 101477636 A | 7/2009 |
|---|---|---|
| CN | 103282784 A | 9/2013 |

(Continued)

OTHER PUBLICATIONS

Kent Lyons et al., "Facet: A Multi-Segment Wrist Worn System," Proceedings of the Annual ACM Symposium on User Interface Software and Technology, pp. 123-129, XP002703648, Oct. 7, 2012.

(Continued)

*Primary Examiner* — Lisa S Landis
(74) *Attorney, Agent, or Firm* — Fay Sharpe LLP (57) ABSTRACT

A wearable device suitable for being worn by a user, said wearable device comprising a proximity sensor configured to detect a proximity parameter representative of a distance between said wearable device and another wearable device; a transceiver configured to send proximity information pertaining to said detected proximity parameter to a processing (Continued)

unit and to receive from said processing unit visual output generated based on said proximity information; and a display layer configured to display said visual output.

20 Claims, 6 Drawing Sheets

(51) Int. Cl.
- *G06F 3/0488* (2013.01)
- *G06F 3/0346* (2013.01)
- *G06F 3/16* (2006.01)

(52) U.S. Cl.
CPC ............ *G06F 3/016* (2013.01); *G06F 3/0346* (2013.01); *G06F 3/04883* (2013.01); *G06F 3/167* (2013.01); *G06F 2200/1637* (2013.01); *G09G 2356/00* (2013.01); *G09G 2360/04* (2013.01); *G09G 2380/02* (2013.01)

(56) References Cited

U.S. PATENT DOCUMENTS

| | | |
|---|---|---|
| 2009/0273560 A1 | 11/2009 | Kalanithi et al. |
| 2010/0066710 A1 | 3/2010 | Koibuchi |
| 2011/0007035 A1 | 1/2011 | Shai |
| 2012/0116709 A1 | 5/2012 | Martin et al. |
| 2013/0127980 A1 | 5/2013 | Haddick et al. |
| 2013/0271350 A1 | 10/2013 | Lyons |
| 2014/0347295 A1* | 11/2014 | Kim ................. G06F 1/163 345/173 |

FOREIGN PATENT DOCUMENTS

| | | |
|---|---|---|
| CN | 103441637 A | 12/2013 |
| JP | 2005502902 A | 1/2005 |
| JP | 201392781 A | 5/2013 |

OTHER PUBLICATIONS

Kent Lyons et al., "Leaked footage: Nokia's Facet smartwatch concept," retrieved from the internet: URL:https://www.youtube.com/watch?v=Bxn_N4vHqXQ, 1 page, Oct. 17, 2013 (retrieved Jul. 17, 2014).

International Search Report for PCT/EP2015/063113 dated Dec. 14, 2015.

Rao et al.; An energy harvesting system for passively generating power from human activities; J. Micromech. Microeng, vol. 23, No. 11 (2013), Oct. 25, 2013, 9 pp.

Cimpian et al.; Analysis of Pulsed vs. Continuous Power Delivery from an Electromagnetic Generator; Journal of Physics: Conference Series; 2013, 6 pp.

Marks; Stroke your car seat to pump up the volume; Technology News; Jan. 4, 2012; 2 pp.

Olberding et al.; AugmentedForearm: Exploring the design space of a display-enhanced forearm; MIT Open Access Articles; 2013; 5 pp.

English Bibliography for Japanese Patent Application Publication No. JP2005502902A; published Jan. 27, 2005; printed from Derwent Innovation on Jun. 19, 2018; 5 pp.

English Bibliography for Japanese Patent Application Publication No. JP2013092781A; published May 16, 2013; printed from Derwent Innovation on Jun. 19, 2018; 4 pp.

PCT Pat. App. No. PCT/EP2015/063113, Written Opinion of the International Searching Authority, dated Dec. 14, 2015, 12 pp.

European Pat. App. No. 14305932.7, Extended European Search Report, dated Mar. 30, 2015, 18 pp.

English Bibliography for Chinese Patent Application No. CN101477636A, published Jul. 8, 2009, printed from Derwent Innovation on Dec. 11, 2018, 4 pp.

English Bibliography for Chinese Patent Application No. CN103282784A, published Sep. 4, 2013, printed from Derwent Innovation on Dec. 11, 2018, 4 pp.

English Bibliography for Chinese Patent Application No. CN103441637A, published Dec. 11, 2013, printed from Derwent Innovation on Dec. 11, 2018, 4 pp.

* cited by examiner

USER-WEARABLE DEVICE FOR PERSONAL COMPUTING SYSTEM, PROCESSING UNIT FOR PERSONAL COMPUTING SYSTEM, AND METHOD ASSOCIATED THEREWITH

FIELD OF THE INVENTION

The present invention relates to the field of wearable devices for personal computing. In particular, the present invention relates to a wearable device suitable for being worn by a user, a processing unit, a system, a method for personal computing and a computer program product for the same.

BACKGROUND

People use personal computing for work and private life, and increasingly use mobile computing devices like a smartphone to remain connected. However, carrying a device in hand is difficult or impossible for many users in different lines of work and daily situations where one cannot take a smartphone out to interact with it. In recent years, wearable computing technologies have been developed to make interaction easier and more immersive. Wearable computing is an important trend that will likely shape the way people access online material. However, existing wearable computing devices are often burdensome and offer only limited interactivity.

Products such as Google Glass [1] and Samsung Galaxy Gear [2] were among the first wearable computing products that gained traction among consumers. These devices function as accessories to other mobile devices and can augment the user experience with a convenient display, either on their glasses or watches. Google Glass also possesses a camera to capture photos and videos. Though they can offer online content to the user somewhere other than on a smartphone screen, users have limited options to control the device. In Google Glass for example, users primarily interact with the device through a single button and their voice. However, voice is an invasive method to control devices and can lead to inaccurate actions if the environment is noisy. Samsung Gear on the other hand can display icons that represent online activity and has a larger number of buttons for functionality like accepting/rejecting calls, etc. However, including many buttons enforces a small button form factor.

SUMMARY

It is an object of embodiments according to the present invention to offer seamless displaying and integrated, effortless interactivity through (configurable) gesture recognition.

According to an aspect of the invention, there is provided a wearable device suitable for being worn by a user. The wearable device comprises: a proximity sensor configured to detect a proximity parameter representative of a distance between said wearable device and another wearable device; a transceiver configured to send proximity information pertaining to said detected proximity parameter to a processing unit and to receive from said processing unit visual output generated based on said proximity information; and a display layer configured to display said visual output.

In this manner, the user is offered seamless visual output based on an integrated interactive wearable device through gesture interaction. More specifically, the proximity sensor allows to become aware of the presence and proximity of other wearable devices, enhancing interactivity through cooperative operation. The detected proximity parameter represents information about the distance between the wearable devices. The skilled person will understand that this proximity parameter may take on many forms, whilst still allowing to determine (or deduct via an analysis of the proximity parameters of multiple wearable device's proximity sensors—centrally or distributed) the position and orientation of the portion(s) of the user which is/are wearing the wearable device(s). The transceiver allows to communicate about this presence and proximity with another device, such as the processing unit (typically a mobile phone device, or a user-carried network-connected personal computing device), so that it may determine, using the position and orientation of said portion of the user, said user's intended gesture, process said gesture in the personal computing application, and generate (or receive from another source, if applicable) visual output based on said processing of said gesture based on said orientation information. The skilled person will understand how to derive or infer from the orientation information the information representing the user's gesture. The transceiver also allows to receive said visual output, in order to display it on said display layer, thereby seamlessly providing the user with visual feedback to his or her gesture.

The skilled person will further appreciate that a transceiver will typically comprise a transmitter and a receiver sharing a significant amount of common circuitry and/or a single housing, but that a transmitter-receiver (with separate or significantly separate circuitry and/or housing) is equally usable and can be substituted for said transceiver.

'Wearing' is taken to mean 'having (something) on one's body as clothing, decoration, or protection'. This definition implies a certain intention of permanency to the action—in other words, simply carrying or holding an item does not equal 'wearing' it, nor is strapping a mobile device to a user's arm to be considered 'wearing' said mobile device.

In an embodiment, the proximity sensor comprises one or more of the following: a radio-frequency sensor; a magnetic field sensor; an optical sensor; an accelerometer and a muscle activity sensor. In this manner, it is possible to detect (determine or deduct) a proximity parameter that represents a distance between the wearable device and another wearable device. The skilled person will understand that, for example, a radio-frequency sensor (e.g. Bluetooth, Near Field Communication, Zigbee, etc.) can determine said proximity parameter based on a measured signal strength, and likewise for a magnetic field sensor, or that an optical sensor can detect a distance on the condition of having a line of sight between the end-points thereof, or that, for example, the data captured by an accelerometer may be used to infer an orientation (and position) of the wearable device so that knowing the orientation (and position) of said other wearable device allows to determine the distance between them, and likewise for a muscle activity sensor that can determine the position and/or orientation of a portion of the user, thereby allowing to determine said distance.

In another embodiment, the wearable device comprises: an accelerometer, optionally as part of the proximity sensor, configured to detect an orientation of said wearable device; and wherein: said transceiver is configured to send orientation information pertaining to said detected orientation to said processing unit and to receive from said processing unit visual output generated based on said orientation information.

In this manner, it is possible to detect the way the wearable device is oriented with respect to some pre-defined reference (typically Earth's gravitational field), and to make this known to the processing unit so that it may determine the orientation of a portion of the user in order to infer said user's intended gesture, process said gesture in the personal computing application, and generate (or receive from another source, if applicable) visual output based on said processing of said gesture based on said orientation information. The skilled person will understand how to derive or infer from the orientation information the information representing the user's gesture.

In a further developed embodiment, the wearable device comprises a tactile sensor configured to detect tactile input to said wearable device, said transceiver being configured to send tactile information pertaining to said detected tactile input to said processing unit and to receive from said processing unit visual output generated based on said tactile information.

In a further developed embodiment, the wearable device (additionally) comprises a muscle activity sensor configured to detect muscle activity of a portion of the user, said transceiver being configured to send muscle activity information pertaining to said detected muscle activity to said processing unit and to receive from said processing unit visual output generated based on said muscle activity information.

In a further developed embodiment, the wearable device (additionally) comprises a microphone configured for registering audio input and an audio speaker configured for playing audio output, said transceiver being configured to send audio input information pertaining to said registered audio input to said processing unit and to receive from said processing unit visual output and audio output based on said audio input information.

In a further developed embodiment, the wearable device (additionally) comprises an energy harvesting unit configured to derive energy from ambient sources, store said energy and deliver said energy to power one or more other components of said wearable device.

In a further developed embodiment, the wearable device (additionally) comprises a vibrating element configured to cause said device to vibrate, in response to said transceiver receiving a vibration command from said processing unit.

In this manner, it is possible to provide a more comprehensive and immersive personal computing experience, in that tactile input, muscle activity input and audio input can be used by the processing unit for processing in a personal computing application, so that it can generate (or receive from another source, if applicable) visual output generated based thereon.

The skilled person will understand that a tactile sensor can be implemented using resistive tactile sensing technology, or capacitive tactile sensing technology, or infrared sensing technology, or any combination thereof. There are also tactile sensing technologies known to the skilled person that detect changes and gradients in the coloration of a user's flesh under his or her fingernails (the 'hyponychium' or 'quick') to determine pressure and friction and thus sense touch (including orientation).

'Ambient' sources of energy are external energy sources, already existing in the background. The skilled person will understand that ambient sources may comprise any one or more of the following: kinetic energy due to movement of said device, thermoelectric energy due to temperature differences between the body heat of the user and the environment, electromagnetic energy due to wireless broadcasting, piezoelectric energy due to deformation of piezoelectric materials, etc.

In a preferred embodiment, the wearable device is a wearable nail device having a form factor suitable for being worn on said user's fingernail.

In this manner, the wearable device can be worn on a user's fingernail, where it is not burdensome, always available and easily visible.

In another preferred embodiment, the wearable device is a wearable sleeve device having a form factor suitable for being worn on said user's hand.

In this manner, the wearable device can be worn on a user's hand, where it offers seamless displaying on a relatively large surface area that is always available to the user, and where it can be effortlessly controlled by a myriad of hand gestures in order to provide integrated personal computing.

A 'hand' is taken to comprise the end part of a person's arm beyond the wrist, including the palm, fingers, and thumb. It is noted that this demarcation is not strict: a part properly belonging to a person's wrist may be considered as part of the person's hand.

According to an aspect of the invention, there is provided a processing unit. The processing unit is configured to: receive from a wearable device proximity information pertaining to a detected proximity parameter representative of a distance between said wearable device and another wearable device; determine spatial information indicating a position and/or an orientation of a portion of a user, said portion wearing said wearable device, based on said received proximity information; and send visual output based on said spatial information to said wearable device.

In this manner, the processing unit (typically a mobile smartphone device, or a user-carried network-connected personal computing device with relatively large processing power) can carry out the steps required for determining gestures and for performing said personal computing based thereon. The skilled person will understand that the processing unit may receive data from and transmit data to a wearable device via a wireless or wired communication channel, such as Wi-Fi, Bluetooth, etc.

In an embodiment, the processing unit is configured to: receive from a wearable device orientation information pertaining to a detected orientation; and send visual output based on said orientation information to said wearable device.

In this manner, the processing unit may determine the user's intended gesture based on said orientation information (and orientation information of other wearable devices, if necessary), to use that gesture for processing in a personal computing application, generating (or receiving from another source, if applicable) visual output generated based thereon and to transmit said visual output to the wearable device for displaying.

In a further developed embodiment, the processing unit is configured for receiving from a wearable device tactile input information pertaining to detected tactile input and sending visual output based on said tactile input information to said wearable device;

In a further developed embodiment, the processing unit is configured for (additionally) receiving from a wearable device muscle activity information pertaining to detected muscle activity and sending visual output based on said muscle activity information to said wearable device;

In a further developed embodiment, the processing unit is configured for (additionally) receiving from a wearable device audio input information pertaining to registered audio input and sending visual output and audio output based on said audio input information to said wearable device; and In a further developed embodiment, the processing unit is configured for (additionally) sending a vibration command to said wearable device in order to alert its user.

In this manner, it is possible to provide a more comprehensive and immersive personal computing experience, in that tactile input, muscle activity input and audio input can be used by the processing unit for processing in a personal computing application, so that it can generate (or receive from another source, if applicable) visual output generated based thereon.

According to an aspect of the invention, there is provided a system comprising a first wearable device according to the hereinabove described embodiments; and a mobile device comprising a processing unit according to any one of the hereinabove described embodiments.

In this manner, the system provides a wearable device that offers effortless and easy personal computing, in that the wearable device can function as a lightweight input and output equipment and the processing unit as a more capable, network-connected personal computing client. Moreover, the user will typically already posses a smartphone or comparable mobile device that can be used for personal computing and can be connected to one or more networks, so that this device may integrate the processing unit. The skilled person will understand that other configurations for the processing unit than being comprised in a mobile device may be considered, but that these will typically comprise carrying, wearing or holding the processing unit (which therefore advantageously is mobile) or the device containing it.

In an embodiment, the system comprises a second wearable device comprising a transceiver for receiving visual output from a processing unit and a display layer for displaying said visual output. Said first and second wearable device are intended for being worn by the same user. The proximity sensor of said first wearable device is configured to detect a proximity parameter representative of a distance between said first wearable device and said second wearable device. The processing unit is configured to send first visual output to said first device, and second visual output to said second device, said second visual output being coordinated with said first visual output. The skilled person will understand that the second wearable device of the system may function as the other ('another') wearable device from the perspective to the first wearable device.

In this manner, the integration of the system is enhanced, in that multiple standalone wearable devices can be used cooperatively, since proximity can mutually be taken into account: a first wearable device can display visual output in tandem (coordinated) with a second wearable device, since their proximity can be determined.

According to an aspect of the invention, there is provided a method for personal computing. The method comprises at a wearable device the following steps: detecting a proximity parameter representative of the distance between a first wearable device and a second wearable device; sending proximity information pertaining to said detected proximity parameter to a processing unit; receiving from said processing unit visual output generated based on said proximity information; and displaying said visual output.

The skilled person will understand that the same technical features and advantages as described hereinabove in relation to the wearable device embodiments and the processing unit embodiments apply also to the method embodiments, mutatis mutandis.

In an embodiment, the method comprises at said wearable device the following steps: detecting an orientation of said wearable device; sending orientation information pertaining to said detected orientation to said processing unit and receiving from said processing unit visual output generated based on said orientation information.

In an embodiment, the method comprises at said wearable device at least one of the following steps: detecting tactile input to said wearable device; sending tactile information pertaining to said detected tactile input to said processing unit; and receiving from said processing unit visual output generated based on said tactile information; detecting muscle activity of a portion of the user; sending muscle activity information pertaining to said detected muscle activity to said processing unit; and receiving from said processing unit visual output generated based on said muscle activity information; registering audio input; sending audio input information pertaining to said registered audio input to said processing unit; receiving from said processing unit visual output and audio output based on said audio input information; and playing said audio output; deriving energy from ambient sources, storing said energy and delivering said energy to power one or more components of said wearable device; and causing said device to vibrate, in response to receiving a vibration command from said processing unit.

According to an aspect of the invention, there is provided a method for personal computing. The method comprises at a processing unit the following steps: receiving from a wearable device proximity information pertaining to a detected proximity parameter representative of a distance between said wearable device and another wearable device; determining spatial information indicating a position and/or an orientation of a portion of a user, said portion wearing said wearable device, based on said received proximity information; and sending visual output based on said spatial information to said wearable device.

In an embodiment, the method comprises at said processing unit the following steps: receiving from a wearable device orientation information pertaining to a detected orientation; and sending visual output based on said orientation information to said wearable device.

In an embodiment, the method comprises at said processing unit at least one of the following steps: receiving from a wearable device tactile input information pertaining to detected tactile input; and sending visual output based on said tactile input information to said wearable device; receiving from a wearable device muscle activity information pertaining to detected muscle activity; and sending visual output based on said muscle activity information to said wearable device; receiving from a wearable device audio input information pertaining to registered audio input; and sending visual output and audio output based on said audio input information to said wearable device; and sending a vibration command to said wearable device in order to alert its user.

According to an aspect of the invention, there is provided a computer program product comprising computer-executable instructions for performing, when the program is run on a computer, all steps of any of the methods embodiments described hereinabove.

The skilled person will understand that the same technical features and advantages as described hereinabove in relation to the wearable device embodiments and the processing unit embodiments apply also to the computer program product embodiments, mutatis mutandis.

Furthermore, it will be appreciated that the embodiments of wearable devices and systems described hereinabove may be accompanied by a programming platform allowing third party organizations and companies (e.g. Facebook) to configure gestures and functionalities of the wearable devices and systems, thus providing strong branding and fashion opportunities.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Smartphones of today both receive online content from the Internet and display it to the user. This is not strictly necessary. Any embedded device with a wireless connection (like Wi-Fi or cellular) can be used to retrieve online content. Wearable displays on the other hand can be seamlessly used to render the information. Such a display can for example be put on a user's hand or fingernail.

The hand and fingers can also be instrumental in understanding the user's intent through gestures. In other words, hand movements on the wearable display can be used to control the viewed information and beyond. This is similar to using touchscreens on a smartphone. Some movements can hint at what the user wants to do with content as well.

In embodiments of the invention, the human hand can be used as a display through a wearable garment that ordinarily looks like a sleeve or artificial nail with the capability of presenting the content and understanding the user intention for the subsequent actions.

Figures 1A, 1B:
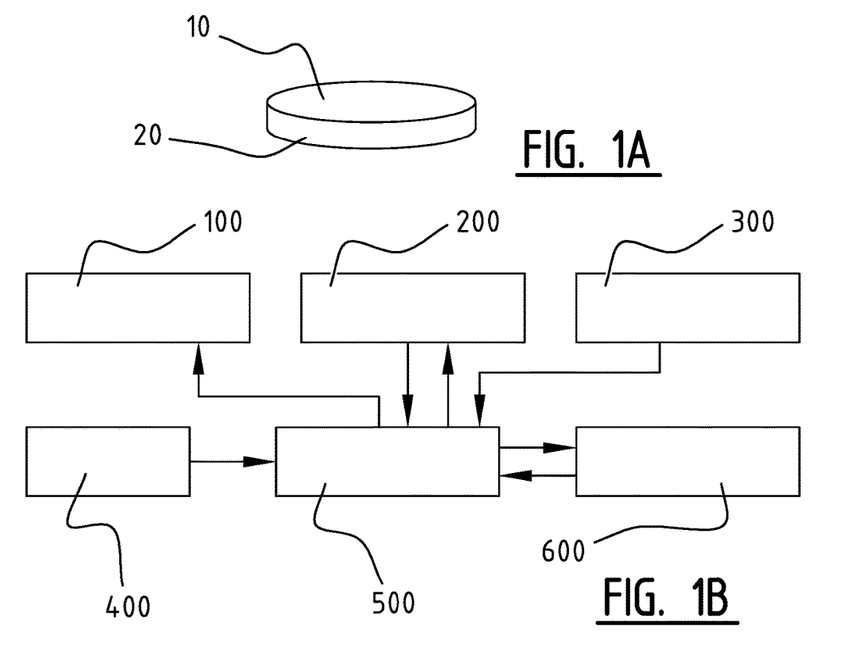
FIG. 1A illustrates an exemplary embodiment of a wearable nail device according to the invention.
FIG. 1B illustrates an exemplary architecture diagram of an embodiment of a wearable nail device according to the invention.

FIG. 1A illustrates an exemplary embodiment of a wearable nail device according to the invention, comprising a processing layer 20 that is covered by a display layer 10, configured for displaying visual output. The processing layer 20 comprises at least the following: a proximity sensor configured to detect a proximity parameter representative of a distance between said wearable device and another wearable device; and a transceiver configured to send proximity information pertaining to said detected proximity parameter to a processing unit and to receive from said processing unit visual output generated based on said proximity information.

FIG. 1B illustrates an exemplary architecture diagram of an embodiment of a wearable nail device according to the invention, comprising a display layer 100, for example in the form of a capacitive touch display, said capacitive touch display also functioning as a tactile sensor for detecting tactile (i.e. 'touch') input, a transceiver 200, for example in the form of a Bluetooth transceiver, a proximity sensor 300, for example in the form of an accelerometer, an energy harvesting unit 400, a micro-controller 500 and a memory 600.

The illustrated embodiment of a wearable device according to the present invention is suitable for being worn on a user's fingernail and offers very accessible display functionality as well as interactions with the connected world to the user. The user can temporarily attach/detach this wearable nail device, and configure it to work with his or her other smart devices such as smartphones (an associated processing unit). The wearable nail device comprises a display layer 100 in the form of a flexible capacitive touch display, with a small form factor fitting it to a typical size of a human fingernail. The wearable nail device also comprises (typically underneath the display layer) i) a micro-controller 500 as the brain of the device, ii) a memory component 600 storing embedded software, iii) a Bluetooth transceiver 200, allowing it to pair with a smartphone or other smart devices of the user, iv) a proximity sensor (accelerometer) 300 which allows the wearable nail device (c.q. a processing unit associated with it) to incorporate gestures and recognize interactions and v) an energy harvesting unit 400, for instance a kinetic power component with a small rechargeable battery, providing the required energy for one or more of the other components, including the display layer. The battery can then be charged through, for instance, kinetic energy of the user's movements throughout the day, as presented in the literature [3,4]. The skilled person will understand that other sources of ambient energy may be used as well.

[3] Yuan Rao et al, "An energy harvesting system for passively generating power from human activities" J. Micromech. Microeng. 23 114012, 2013

[4] A Cimpian et al, "Analysis of Pulsed vs. Continuous Power Delivery from an Electromagnetic Generator", J. Phys.: Conf. Ser. 476 012058, 2013

Figure 2:
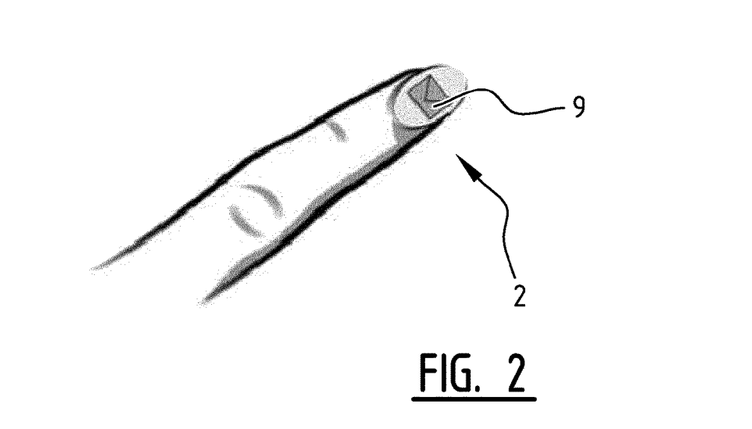
FIG. 2 illustrates a wearable nail device embodiment according to the present invention.

FIG. 2 illustrates a wearable nail device embodiment 2 according to the present invention, being worn on a user's index-finger fingernail, comprising a display layer that is configured to output to a user a visual output 9. In this embodiment, the user has received a new message, such as an email message, a chat message or a Short Message Service text message. This reception happens at a processing unit (not shown), which sends visual output to indicate this reception to said wearable nail device 2. The wearable nail device 2 notifies the user of this reception, for instance by displaying a 'new message' notification 9. The size and shape of the wearable nail device 2 are merely illustrative and not meant to be limiting. Likewise, the size, shape, and location of the notification 9 on the nail device 2 are merely illustrative and not meant to be limiting. The notification 9 can be anything ranging from simply the current time to those defined by the content provider, and personalized and configured by the user (through a middleware). The notification 9 is rendered for the configured size of the nail device 2 and pushed through a wireless connection (e.g. via Bluetooth) to the device 2.

The user can choose to cancel and erase the notification 9 from the display, e.g. by performing a sweep gesture on top of the (corresponding, if there are multiple) nail device 2. Using the touch sensor component of the nail device 2 enables the system to react to this gesture and removes the notification/content 9 from the selected nail device 2. Alternatively the user can choose to display the notification 9 by touching a smart display with the same finger. In this case the nail device 2 will recognize the intention of the user and send the visual output 9 (i.e. the content of the notification) to the display after pairing through the communication component (e.g. Bluetooth).

Figure 3:
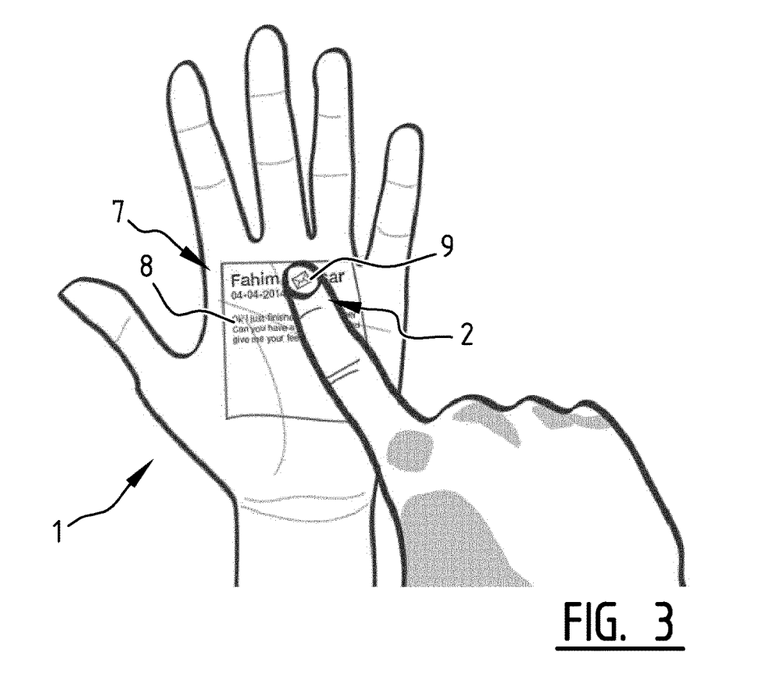
FIG. 3 illustrates a system embodiment according to the present invention.

FIG. 3 illustrates a system embodiment according to the present invention for personal computing comprising a wearable sleeve device 1, worn on a user's left hand, and a wearable nail device 2, worn on said user's right-hand index fingernail. Said wearable sleeve device 1 comprises a display layer 7, here shown as a rectangular display situated on said user's palm, oriented along the length of said user's hand. Said wearable nail device 2 also comprises a display layer, here shown as an approximately oval-shaped display fitted to conform to said user's fingernail surface. The skilled person will understand that the sizes and shapes of the wearable sleeve device 1 and the wearable nail device 2 as well as the portions of the user's body that are wearing them are merely illustrative and are not meant to be limiting.

In this embodiment, the wearable nail device has been notified that the user has received a message, for example as in FIG. 2, and displays a notification icon visual output 9. The size, shape and location of said visual output 9 are merely illustrative and not meant to be limiting. In further developed embodiments, a vibrating element of the wearable nail device 2 may have caused said wearable nail device 2 to vibrate upon reception of such a notification, in order to alert said user appropriately.

After the user has been notified or alerted, he may choose to interact with the system, by combining the functionality of both wearable devices 1, 2 in order to display and read said received message. To this end, said user may first position his left hand (with the wearable sleeve device 1) in a special manner, for instance by fully extending his fingers thereof to signal to the system that the wearable sleeve device's 1 display layer 7 may be activated to display a visual output 8. The size, shape and location of the visual output 8 are merely illustrative and not meant to be limiting. The skilled person will understand that such a position may be interpreted (as a gesture) by the system on the basis of pre-determined settings or user-defined settings or the like.

When the display layer 7 of the of the wearable sleeve device is thus activated, the user may request the display layer 7 of the wearable sleeve device 1 to display 8 the received message for reading by touching (or approaching closely) said display layer 7 (or more generally, said wearable sleeve device 1) with said wearable nail device 2 (or with the finger on which said device 2 is worn on the fingernail). The wearable sleeve device 1 may detect a proximity parameter representative of the distance between it and the wearable nail device 2, and send information pertaining thereto to a processing unit (not shown) so as to allow the processing unit to process said information and generate a visual output 8 in response. The skilled person is well-aware of how to provide data coupling and transmission between multiple devices to this end.

Figure 4:
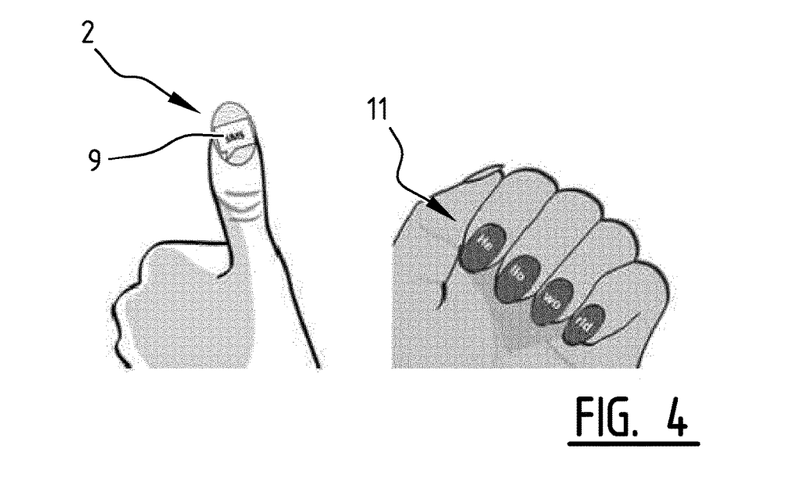
FIG. 4 illustrates another system embodiment according to the present invention.

FIG. 4 illustrates a system embodiment according to the present invention, showing a first wearable nail device 2 worn on said user's left-hand thumbnail, and four second wearable nail devices 11, each of said four second devices 11 worn on a respective fingernail of said user's right-hand fingers. The size, shape and location of the wearable nail devices 2 and 11 are merely illustrative and not meant to be limiting. In this embodiment, the user can configure the nail devices 11 to act as multi-connected displays when aligned together to show the visual output or content for one or both hands. The proximity sensor (not indicated in the figure) of at least one of the second wearable nail devices 11 can, for example, detect proximity parameters representing the distances to each of the other devices, and send information pertaining thereto to a processing unit (not shown), where the information is interpreted and processed accordingly. The figure illustrates this example, where the user has received a Short Message Service text message ("Hello world"). This reception typically happens at the processing unit (not indicated) or another network-connected mobile device, which sends visual output to the first wearable nail device 2 to be displayed, showing a notification 9 on the first wearable nail device's 2 display layer. The size, shape, and location of the notification on the nail device are merely illustrative and not meant to be limiting. The notification is rendered for the configured size of the nail device and pushed through the wireless connection (e.g. via Bluetooth) to the device.

By performing, e.g., a closing hand gesture and aligning the fingernails next to each other the visual output (here, the content of the received text message) can be rendered across multiple nail device display layers. The size, shape, and location of the message on the nail device are merely illustrative and not meant to be limiting.

This functionality can be used for displaying different messages depending on the customization; that is, the user is able to specify which applications are allowed to use this functionality through a mobile middleware personalization component, optionally present in the nail device. Content providers can also optimize their content for this functionality.

Figure 5:
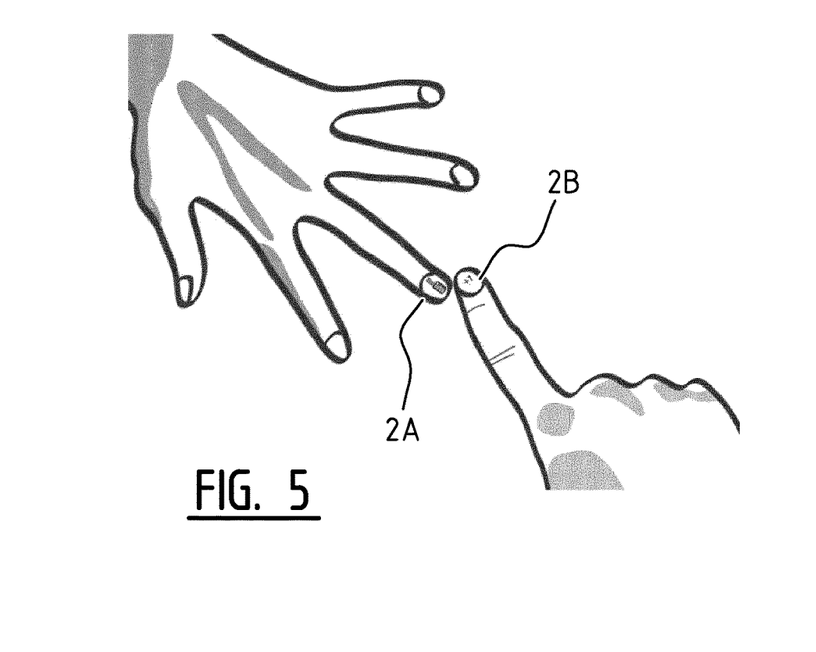
FIG. 5 illustrates another system embodiment according to the present invention.

FIG. 5 illustrates another system embodiment according to the present invention, comprising a plurality of wearable nail devices: a first wearable nail device 2A is shown worn on a fingernail of a user's left-hand middle finger, and a second wearable nail device 2B is shown worn on a fingernail of said user's right-hand index finger. The skilled person will appreciate that zero, one or more other fingernails of said user may also wear a wearable nail device, and that either or both of the shown hands may wear a wearable sleeve device, even if this is not explicitly indicated in the figure. Also, the size and shape of the wearable nail devices 2A, 2B are merely illustrative and not meant to be limiting.

In this embodiment, the first nail device 2A is shown displaying visual output on its display layer—here, an icon of an online video streaming service, which may represent a notification from a channel to which the user is subscribed. The size, shape and location of the visual output are merely illustrative and not meant to be limiting. This visual output is sent by a processing unit (not shown) to the first nail device 2A. If the user likes the notification, she may decide to indicate this by extending her right index finger wearing the second wearable nail device 2B. This gesture may for example have been pre-defined to activate the '+1'-functionality or 'like'. In the figure, a '+1'-notification is shown on the display layer of the second wearable nail device 2B. By then holding the second nail device close to the first nail device 2A (or even touching it with her index finger), the user may 'like' (i.e. '+1') said notification displayed on said first nail device's 2A display layer. The proximity sensor of the first nail device 2A may detect the proximity—via a proximity parameter—of the second nail device 2B and, in response thereto, the processing unit may determine spatial information indicating a position and/or an orientation of a portion of the user—here, the way the user's right index finger is extended and held close to or touching the user's left middle finger. This spatial information may be determined by analyzing the signal strength of a wireless signal (e.g. NFC or Bluetooth Low Energy, or any suitable technology now known or later developed), or by registering tactile input if the user touches the first nail device, or by analyzing orientation information from multiple wearable devices.

Afterwards, the processing unit may upload a confirmation for said 'like' to said online video streaming service. In this manner, the user can seamlessly interact with online content and notifications, through the cooperative use of the wearable devices 2A, 2B she is wearing.

Figure 6:
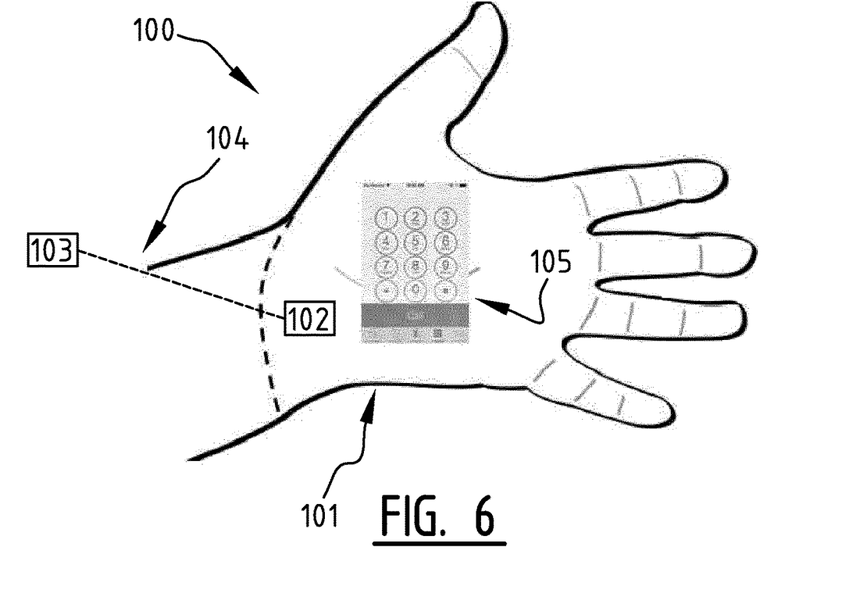
FIG. 6 illustrates a wearable sleeve device according to the present invention.

FIG. 6 illustrates a wearable sleeve device 100 according to the present invention. The sleeve device 100 comprises a display layer 101 for displaying visual output 105. It will be understood by the skilled person that the display layer 101 may cover the entire sleeve device 100, or only part of it. In this specific exemplary embodiment, the entire sleeve device is used for displaying the content (i.e. the display layer 101 covers the entire sleeve device 100; in other words, the entire sleeve device 100 can function as a display). The sleeve device 100 contains a small micro-controller 102, that communicates with the processing unit 103, renders the visual output 105 on the sleeve device's display layer 101 and collects data from various sensors on the sleeve device 100. The processing unit 103 contains units such as a CPU, memory, etc., that are necessary for personal computing and handles major tasks that a mobile device is typically involved with. These tasks may include communicating with Wi-Fi and cellular networks. The processing unit 103 is not necessarily situated on the sleeve device 100 but may be connected to it wirelessly or through a wire 104, as is shown in this example. Once it is detected that user would like see some content, the content is displayed on the display layer 101, typically above the palm. A number of methods can be used in order to detect the user intention. Some examples are provided in Embodiment 2 and 3. If the user wants to make a phone call, the sleeve device 100 displays a keypad as visual output 105, as shown in the figure. This example embodiment assumes that the user has accessories for talking on the phone such as microphone and audio speakers such as headphones, and that those accessories are able to communicate with the processing unit 103. The sleeve device 100 contains conductive fabric that has the capability of capacitive sensing. This way, it is able to detect the points where the user touches. In other words, the sleeve device 100 has touchscreen functionality. If the user intends to call number 911 for example, she has to press the numbers 9,1,1 in sequence on her palm.

The size and the shape of the wearable sleeve device 100 are merely illustrative and not meant to be limiting. Other sizes and shapes of the sleeve device 100 are possible. It can cover the whole or only part of the hand. In some embodiments, it may for example include the fingers.

Similarly, the size, shape, and location of the micro-controller 102 are merely illustrative and not meant to be limiting. Other sizes, shapes and locations for micro-controller 102 are possible on Sleeve. As an example, this micro-controller may be located on the wrist as shown in FIG. 1 or it may be located at the back of the hand.

Similarly, the size, shape, and location of the processing unit 103 are merely illustrative and not meant to be limiting. Other sizes, shapes and locations for processing unit 103 are possible. It can be clipped on a cloth or carried on the user's pocket, etc.

Similarly, the connection between the micro-controller 102 and the processing unit 103 is merely illustrative and not meant to be limiting. The connection between the micro-controller 102 and the processing unit 103 is not constrained to the wire 104. Other technologies that use a wireless medium can be used to pair the micro-controller 102 and the processing unit 103. One example for such technologies is Bluetooth Low Energy.

Similarly, the size, shape, and location of the visual output 105 are merely illustrative and not meant to be limiting. The visual output 105 shown on the sleeve device 100 is not constrained to a phone keypad. It can show content from any application installed on the processing unit 103. Other sizes, shapes, and locations of the visual output 105 are possible. Some applications may for example require a rectangle shape while for others a circular shape is preferred. Through the touchscreen capability, the user can also control the size, location and the shape of the displayed visual output 105.

The micro-controller 102 may include other elements such as data storage. It may be configured to perform various types of image processing and analysis on the visual output 105 displayed on the display layer 101 of the wearable sleeve device 100. The micro-controller 102 also collects data from various sensors located on the sleeve device 100 and delivers that to the processing unit 103.

In some embodiments, a wearable sleeve device may contain conductive fabric with capacitive sensing capability. This makes the sleeve device understand human input by detecting the points touched by the user ('tactile input'). In other words, it functions similarly to touchscreens. Such smart fabric is in consideration for use in car seats in the auto-industry by weaving a soft polymer-based fibre into a fabric with electrical properties that change based on the touched point [2].

Figure 7:
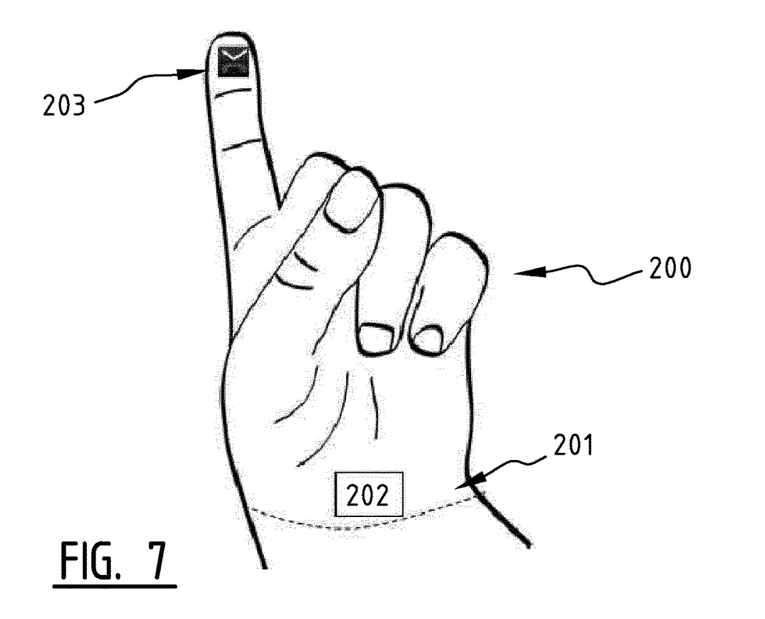
FIG. 7 illustrates an embodiment of a wearable sleeve device according to the present invention.

[2] Stroke your car seat to pump up the volume, http://www.newscientist.com/article/mg21328466.300-stroke-your-car-seat-to-pump-up-the-volume.html FIG. 7 illustrates an embodiment of a wearable sleeve device 200 according to the present invention. The sleeve device 200 is worn on a user's left hand, and comprises a muscle activity sensor 202 (e.g. an electromyography sensor) that is configured to detect muscle activity of a portion of the user. In this example, the muscle activity sensor 202 detects the shape in which the user's hand is held. This sensor recognizes characteristics of the muscles, which indicate the shape of the hand. This shape hints at what the user is interested in doing or seeing. For example, if the user is holding up the index finger with all other fingers closed, he may intend to see the last received notification 203 at the tip of the finger—the example here shows a missed call notification as visual output 203 on the display layer 201 of said wearable sleeve device 200. Moreover, the detected muscle activity sensor data may constitute a proximity parameter, in that it can be used (along with sensor data of other wearable devices) to determine the proximity between those devices.

As in the earlier embodiment, the size and the shape of the sleeve device 200 are merely illustrative and not meant to be limiting. Other sizes and shapes of the sleeve device 200 are also possible. In this embodiment, the sleeve device 200 covers at least the index finger, but it will be understood by the skilled person that other configurations are also possible.

Similarly, the size, shape, and location of the sensor 202 are merely illustrative and not meant to be limiting. Other sizes, shapes and locations for the sensor 202 are possible on the sleeve device 200. In this example, the sensor 202 is situated on top of the wrist. The sensor 202 can detect how the muscles in the wrist are positioned. At every hand position, these muscles will have different characteristics. The sensor 202 is configured to detect these characteristics. The sensor 202 can be placed anywhere and can be in any shape that makes it possible to detect spatial information of a portion of a user.

Similarly, the size, shape and location of the notification 203 are merely illustrative and not meant to be limiting. The notification 203 is not limited to a missed call notification. It can display notification icons from any installed application. Other sizes, shapes, and locations of the notification 203 are possible. Some applications may for example require a rectangle notification while for others a circular shape is preferred.

Figure 8:
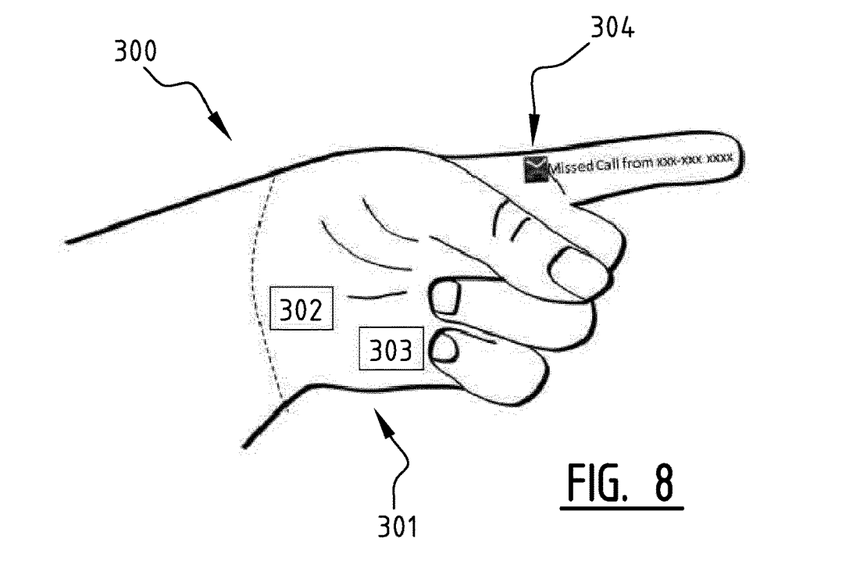
FIG. 8 illustrates another embodiment of a wearable sleeve device according to the present invention.

FIG. 8 illustrates an embodiment of a wearable sleeve device 300 according to the present invention, comprising a sensor 302 analogous to the sensor 202 in FIG. 7. In this embodiment, the sleeve device also comprises an accelerometer 303. The accelerometer 303 can detect (or be used to infer) the orientation of the hand. If the hand is oriented upwards with the index finger extended, the tip of the index finger is used as in FIG. 7. However, if the hand is oriented sideways and the index finger is extended, which is detected by the sensor 302, a more detailed visual output comprising a notification 304 is displayed on the index finger—here, more specifically on the part of the sleeve device's display layer covering the inside of said index finger. In the example in this figure, the missed call information also includes the number that made the call.

As in the earlier embodiment, the size and the shape of the sleeve device 300 are merely illustrative and not meant to be limiting. Other sizes and shapes of the sleeve device 300 are possible. In this embodiment, the sleeve device 300 covers at least the index finger, but it will be understood by the skilled person that the entire hand, or any other or all fingers (and/or the thumb, the palm, the back of the hand, etc.) could be covered too.

Similarly, the size, shape, and location of the sensor 302 are merely illustrative and not meant to be limiting. Other sizes, shapes and locations for the sensor 302 are possible on or in the sleeve device 300. In this example, it is situated on top of the wrist. The sensor can detect how the muscles in the wrist are positioned. At every hand position, these muscles will have different characteristics. The sensor 302 is configured to detect these characteristics, as is well-known to the person skilled in the art. The sensor can be placed anywhere and in any shape that makes it possible to detect the hand position.

Similarly, the size, shape, and location of the accelerometer 303 are merely illustrative and not meant to be limiting. Other sizes, shapes and locations for the accelerometer 303 are possible on the sleeve device 300. The information inferred by the accelerometer need not be limited to the orientation of the hand and can be used by any other application. Also, the use of orientation information is not necessarily limited to the way the notification is displayed.

Similarly, the size, shape and location (including orientation) of the notification 304 are merely illustrative and not meant to be limiting. The notification 304 is not limited to missed call notification. Even for missed call notifications, the caller ID of the number can be displayed, if it is in the contact list of the user. It can also display a notification icon from other installed applications. Other sizes, shapes, and locations of the notification 304 are possible.

Figure 9:
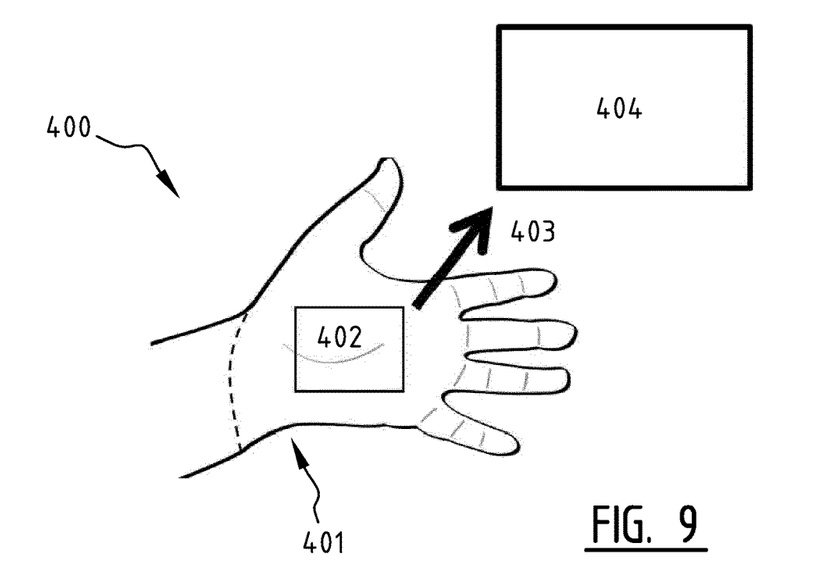
FIG. 9 illustrates an embodiment of a wearable sleeve device according to the present invention.

FIG. 9 illustrates an embodiment of a wearable sleeve device 400 according to the present invention, worn on the left-hand of a user (not indicated). The sleeve device 400 is shown displaying visual output 402 on (part of) its display layer 401. In this example embodiment, the display layer 401 covers the entire wearable sleeve device 400, but it will be appreciated by the skilled person that this need not be so necessarily. It is assumed for this example embodiment that the user would like to place (i.e. 'also perceive') the visual output 402 on an external display 404. In order to do that, the user merely has to slide her hand in a direction 403 towards the display 404. This gesture can be recognized by a processing unit (not shown) based on information pertaining to the user's hand's relative motion, which can be detected by, for example, an accelerometer. The skilled person will understand that the external display 404 may be required to have an open API (Application Programming Interface) and that the user is able to stream any image or video onto this display 404.

As in the earlier embodiments, the size and the shape of the sleeve device 400 are merely illustrative and not meant to be limiting. Other sizes and shapes of the sleeve device are possible. Similarly, the size, shape, and location of the visual output 402 are merely illustrative and not meant to be limiting. The visual output 402 can be content from various applications. Other sizes, shapes, and locations of the visual output 402 are possible. Similarly, the size, shape, and location of the display 404 are merely illustrative and not meant to be limiting. Other sizes, shapes, and locations of the display 404 are possible. The location of the display 404 is preferably in close proximity, and the sleeve device 400 should be able to detect the presence of the display 404 through any method available. One such method can for example use signals in a wireless medium.

Figure 10:
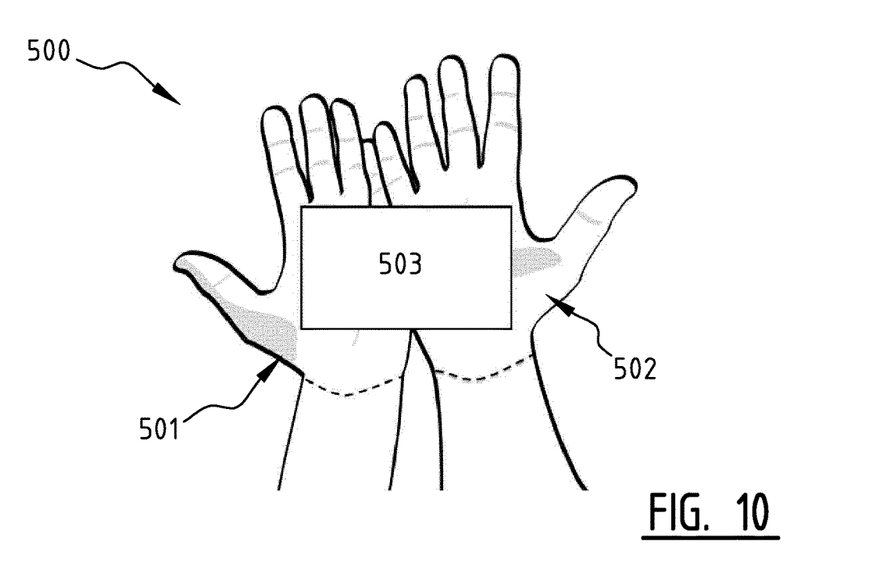
FIG. 10 illustrates an embodiment of a system according to the present invention.

FIG. 10 illustrates an embodiment of a system 500 according to the present invention, comprising a first wearable sleeve device 501 worn on a user's left hand and a second wearable sleeve device 502 worn on said user's right hand. If the user wants to see the content 503 on a larger display area than a single wearable sleeve device can provide, she can use multiple together, in a system 500 comprising these wearable devices 501, 502. In the scenario depicted here, the user brings her two hands together, both hands facing upward. In this case, the visual output 503 provided by a processing unit (not shown) is displayed on (part of) the area comprising the display layer of the first wearable sleeve device 501 and the display layer of the second wearable sleeve device 502.

The skilled person will appreciate that multiple wearable devices worn by multiple users may also together be comprised in a wearable system, e.g. to allow friends to share and connect the display layers of their respective wearable devices, thereby increasing the available display layer area. Likewise, the skilled person will appreciate that a single user may wear multiple wearable systems, for instance one on the left-hand side and two on the right-hand side. Also, the skilled person will appreciate that these two embodiments may coexist in that a first user may wear multiple wearable systems, of which one or more is shared with ('also worn in part by') a second user.

As in earlier embodiments, the size and the shape of the sleeve devices 501 and 502 in FIG. 10 are merely illustrative and not meant to be limiting. Also, the method to understand the user's intent on displaying the content 503 on both Sleeves is not limited to bringing the two hands together, palms facing up. Other mechanisms can be developed to signal this intent. Similarly, the size, shape, and location of the content 503 in FIG. 10 are merely illustrative and not meant to be limiting. The content 503 can be content from various applications. Other sizes, shapes, and locations of the content 503 are possible.

The skilled person will understand that many use cases and gestures can be considered and defined for using the wearable system and devices. For example, as a further development of the example shown in FIG. 10, if the content 503 that is shown is a book, a website or another document that can be paged through, the user may flip his right hand in a manner analogous to flipping a page of a book. The system 500 may have been configured to interpret this gesture and to cause the content 503 that is displayed to be advanced a page (or an analogous measure).

Figure 11:
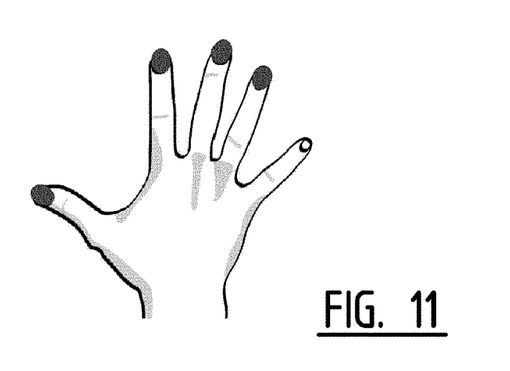
FIG. 11 illustrates another system embodiment according to the present invention.

FIG. 11 illustrates another system embodiment according to the present invention, comprising four wearable nail devices, each of said four devices worn on a respective fingernail (c.q. thumbnail) of said user's right hand. In this specific example, no nail device is worn on the user's pinky fingernail. It will be appreciated that, in general, any finger can wear a nail device In addition to the awareness services that are supported by the nail device and system, a nail device can be also used to display certain colours and/or images. The colours and/or images can be set by the user to reflect, say, their mood for the day, or to follow their friends' and celebrities' nail colour and/or imagery through social networks such as Twitter, etc. Using this capability, the user can pre-set a list of display colours (statically or dynamically from their social networks) on middleware for the nail device and switch between these throughout the day using for example certain hand gestures. It will be appreciated that this functionality of the nail device and/or system will create an enormous opportunity for branding where users will choose to display the design sponsored by their favourite company or celebrities.

As in an earlier embodiment, the size and shape of the wearable nail devices shown in FIG. 11 are merely illustrative and not meant to be limiting.

Figure 12:
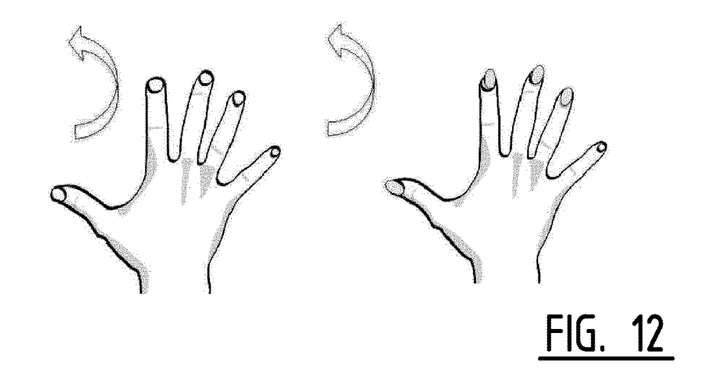
FIG. 12 illustrates an embodiment of a system according to the present invention.

FIG. 12 illustrates an embodiment of a system according to the present invention, using a special position or gesture to activate/switch on or deactivate/switch off (e.g. by erasing the visual output from the display layer) the system embodiment according to FIG. 11. The nail device can be further set up to be switched on through a hand gesture, e.g. when the user opens wide his or her hand twice in a short time, as illustrated in FIG. 11. The user can further customize this gesture through a middleware customization component (not shown). The skilled person will appreciate that this gesture is only one of many possible gestures for accomplishing this functionality, and that the system embodiment is not limited thereto.

Figure 13:
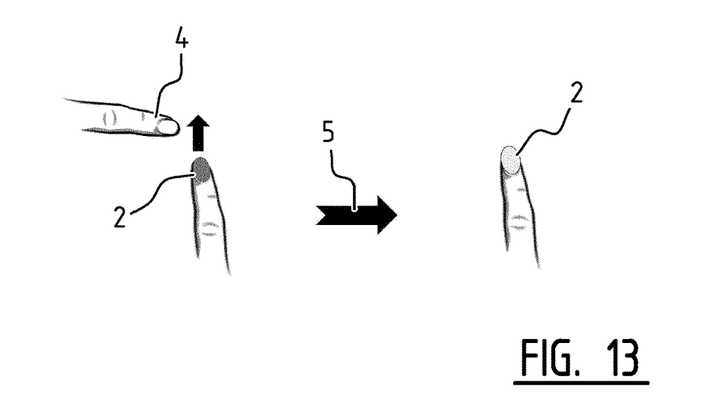
FIG. 13 illustrates another embodiment of a wearable nail device according to the present invention.

FIG. 13 illustrates another embodiment of a wearable nail device 2 according to the present invention, worn on a user's left-hand thumbnail. In this example, the nail device 2 detects tactile ('touch') input of another finger 4 to activate/switch on or deactivate/switch off the nail device. The transition is represented in the figure by arrow 5, showing on the left an active wearable nail device 2 and on the right a deactivated wearable nail device 2. As in an earlier embodiment, the size and shape of the wearable nail device 2 are merely illustrative and not meant to be limiting.

In an example embodiment, the wearable nail device 2 can be set to completely switch off when the user holds it in a clenched fist for number of seconds (configurable by user). The display can also be turned off and the device 2 can switch to the listen mode only when a 'sweep' gesture is used on the nail device 2 twice.

Whilst the principles of the invention have been set out above in connection with specific embodiments, it is to be understood that this description is merely made by way of example and not as a limitation of the scope of protection which is determined by the appended claims.

The invention claimed is:

1. A first user-wearable device for a personal computing system, said first user-wearable device comprising:
   a proximity sensor configured to detect a proximity parameter representative of a distance between said first user-wearable device and a second user-wearable device while the first and second user-wearable devices are worn by a user;
   a first transceiver configured to send proximity information pertaining to said detected proximity parameter to a processing unit of a personal computing system associated with the user and to receive from said processing unit visual output generated based on said proximity information; and
   a first display layer at least partially covering the proximity sensor and transceiver and configured to display said visual output to the user on the first user-wearable device.

2. The first user-wearable device of claim 1, wherein the proximity sensor comprises one or more of the following:
   a radio-frequency sensor;
   an optical sensor;
   a magnetic field sensor;
   an accelerometer and
   a muscle activity sensor.

3. The first user-wearable device of claim 1, wherein the proximity sensor comprises an accelerometer configured to detect an orientation of said first user-wearable device;
   wherein said first transceiver is configured to send orientation information pertaining to said detected orientation to said processing unit and to receive from said processing unit visual output generated based on said orientation information.

4. The first user-wearable device of claim 1, comprising at least one of the following:
   a tactile sensor configured to detect tactile input to said first user-wearable device, wherein said first transceiver is configured to send tactile information pertaining to said detected tactile input to said processing unit and to receive from said processing unit visual output generated based on said tactile information;
   a muscle activity sensor configured to detect muscle activity of at least a portion of the user while the first user-wearable device is worn by the user, wherein said first transceiver is configured to send muscle activity information pertaining to said detected muscle activity to said processing unit and to receive from said processing unit visual output generated based on said muscle activity information;
   a microphone configured to register audio input and an audio speaker configured to play audio output, wherein said first transceiver is configured to send audio input information pertaining to said registered audio input to said processing unit and to receive from said processing unit visual output and audio output based on said audio input information;
an energy harvesting unit configured to derive energy from ambient sources, store said energy and deliver said energy to power one or more other components of said first user-wearable device; and
a vibrating element configured to cause said first user-wearable device to vibrate in response to said first transceiver receiving a vibration command from said processing unit.

5. The first user-wearable device of claim 1, being a user-wearable nail device having a form factor suitable for being worn on said user's fingernail.

6. The first user-wearable device of claim 1, being a user-wearable sleeve device having a form factor suitable for being worn on said user's hand.

7. A processing unit for a personal computing system, the processing unit configured to:
receive from a first user-wearable device proximity information pertaining to a detected proximity parameter representative of a distance between said first user-wearable device and a second user-wearable device while the first and second user-wearable devices are worn by a user;
determine spatial information indicating a position and/or an orientation of at least a portion of the user, said portion relating to where said first user-wearable device is worn by the user, based on said received proximity information; and
send visual output based on said spatial information to said first user-wearable device for display to the user on the first user-wearable device.

8. The processing unit of claim 7, configured to:
receive from the first user-wearable device orientation information pertaining to a detected orientation of the first user-wearable device; and
send visual output based on said orientation information to said first user-wearable device for display to the user on the first user-wearable device.

9. The processing unit of claim 8, configured to perform at least one of the following:
receive from the first user-wearable device tactile input information pertaining to detected tactile input to the first user-wearable device and send visual output based on said tactile input information to said first user-wearable device for display to the user on the first user-wearable device;
receive from the first user-wearable device muscle activity information pertaining to detected muscle activity of at least a portion of the user while the first user-wearable device is worn by the user and send visual output based on said muscle activity information to said first user-wearable device for display to the user on the first user-wearable device;
receive from the first user-wearable device audio input information pertaining to audio input registered by the first user-wearable device and send visual output and audio output based on said audio input information to said first user-wearable device, the visual output for display to the user on the first user-wearable device and the audio output for play to the user via the first user-wearable device; and
send a vibration command to said first user-wearable device in order to alert the user by causing the first user-wearable device to vibrate.

10. A personal computing system, comprising:
the first user-wearable device according to claim 1; and
a mobile device comprising the processing unit, wherein the processing unit is configured to receive from the first user-wearable device the proximity information pertaining to the detected proximity parameter representative of the distance between said first user-wearable device and the second user-wearable device, wherein the processing unit is configured to determine spatial information indicating a position and/or an orientation of at least a portion of the user, said portion relating to where said first user-wearable device is worn by the user, based on said received proximity information, wherein the processing unit is configured to send visual output based on said spatial information to said first user-wearable device for display to the user on the first user-wearable device.

11. The personal computing system of claim 10, further comprising:
the second user-wearable device, comprising:
a second transceiver configured to receive second visual output from the processing unit, the second visual output being generated by the processing unit based on the proximity information sent to the processing unit by the first user-wearable device; and
a display layer at least partially covering the second transceiver and configured to display said second visual output to the user on the second user-wearable device;
wherein the visual output sent by the processing unit to said first wearable device is first visual output, wherein the processing unit is configured to coordinate said second visual output with said first visual output.

12. A method for personal computing, comprising:
receiving from a first user-wearable device at a processing unit of a personal computing system associated with a user proximity information pertaining to a detected proximity parameter representative of a distance between said first user-wearable device and a second user-wearable device while the first and second user-wearable devices are worn by the user;
determining spatial information indicating a position and/or an orientation of at least a portion of the user, said portion relating to where said first user-wearable device is worn by the user, based on said received proximity information; and
sending visual output based on said spatial information to said first user-wearable device for display to the user on the first user-wearable device.

13. The method of claim 12, further comprising:
receiving from the first user-wearable device orientation information pertaining to a detected orientation of the first user-wearable device; and
sending visual output based on said orientation information to said first user-wearable device for display to the user on the first user-wearable device.

14. The method of claim 12, further comprising:
receiving from the first user-wearable device tactile input information pertaining to detected tactile input to the first user-wearable device and sending visual output based on said tactile input information to said first user-wearable device for display to the user on the first user-wearable device;
receiving from the first user-wearable device muscle activity information pertaining to detected muscle activity; of at least a portion of the user while the first user-wearable device is worn by the user and sending visual output based on said muscle activity information to said first user-wearable device for display to the user on the first user-wearable device;

receiving from the first user-wearable device audio input information pertaining to audio input registered by the first user-wearable device and sending visual output and audio output based on said audio input information to said first user-wearable device, the visual output for display to the user on the first user-wearable device and the audio output for play to the user via the first user-wearable device; and sending a vibration command to said first user-wearable device in order to alert the user by causing the first user-wearable device to vibrate.

15. A non-transitory computer-readable medium storing program instructions that, when executed by a processor, cause a processor-controlled personal computing system to perform the method of claim 12.

16. The first-user wearable device of claim 1, the visual output indicating a gesture determined based on the proximity information.

17. The first-user wearable device of claim 1, wherein the processing unit is configured to interpret the proximity information to represent a gesture and to generate the visual output based on the gesture.

18. The processing unit of claim 7, the visual output indicating a gesture determined based on the proximity information.

19. The processing unit of claim 7, wherein the processing unit is configured to interpret the proximity information to represent a gesture and to generate the visual output based on the gesture.

20. The method of claim 12, the visual output indicating a gesture determined based on the proximity information.

* * * * *